(12) United States Patent
Jang et al.

(10) Patent No.: US 8,141,897 B2
(45) Date of Patent: Mar. 27, 2012

(54) GUIDE PLATE FOR SIDE AIR BAG

(75) Inventors: Myung-ryun Jang, Suwon-si (KR);
Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Autoliv Development AB, Vargarda (SE)

( * ) Notice: Subject to any disclaimer, the term of this patent is extended or adjusted under 35 U.S.C. 154(b) by 629 days.

(21) Appl. No.: 11/732,488

(22) Filed: Apr. 3, 2007

(65) Prior Publication Data
US 2007/0241543 A1     Oct. 18, 2007

(30) Foreign Application Priority Data

| Apr. 4, 2006 | (KR) | 20-2006-0008880 U |
| Apr. 18, 2006 | (KR) | 20-2006-0010396 U |
| Apr. 19, 2006 | (KR) | 20-2006-0010487 U |

(51) Int. Cl.
*B60R 21/20* (2011.01)
(52) U.S. Cl. ........... 280/728.2; 280/730.2; 280/743.2
(58) Field of Classification Search ......... 280/728.1, 280/728.2, 730.1, 730.2, 743.2
See application file for complete search history.

(56) References Cited

U.S. PATENT DOCUMENTS

| 5,762,363 A * | 6/1998 | Brown et al. | 280/730.2 |
| 5,799,971 A * | 9/1998 | Asada | 280/730.2 |
| 6,520,533 B2 * | 2/2003 | Tanase et al. | 280/730.2 |
| 6,923,286 B2 * | 8/2005 | Sato et al. | 180/274 |
| 6,923,471 B2 * | 8/2005 | Salzle | 280/728.2 |
| 7,100,992 B2 * | 9/2006 | Bargheer et al. | 280/730.2 |
| 2001/0040360 A1 * | 11/2001 | Ishiyama et al. | 280/728.2 |
| 2002/0024202 A1 * | 2/2002 | Kubota et al. | 280/730.2 |
| 2002/0096864 A1 * | 7/2002 | Asano et al. | 280/730.2 |
| 2004/0178607 A1 * | 9/2004 | Kawauchimaru et al. | 280/730.1 |
| 2005/0087961 A1 * | 4/2005 | Lee | 280/728.2 |
| 2005/0173902 A1 * | 8/2005 | Boxey | 280/730.2 |
| 2005/0225060 A1 * | 10/2005 | Wold | 280/728.2 |
| 2006/0043708 A1 * | 3/2006 | Inazu et al. | 280/730.2 |
| 2006/0061072 A1 * | 3/2006 | Suekuni et al. | 280/730.2 |
| 2006/0119084 A1 * | 6/2006 | Coon et al. | 280/730.2 |
| 2006/0255568 A1 * | 11/2006 | Demel et al. | 280/728.2 |
| 2007/0063490 A1 * | 3/2007 | Minamikawa | 280/728.2 |
| 2007/0132217 A1 * | 6/2007 | Seong | 280/730.2 |
| 2007/0241542 A1 * | 10/2007 | Wallace | 280/730.2 |
| 2007/0241543 A1 * | 10/2007 | Jang et al. | 280/730.2 |
| 2009/0096194 A1 * | 4/2009 | Sugimoto | 280/728.2 |
| 2009/0267327 A1 * | 10/2009 | Takahashi et al. | 280/728.2 |

* cited by examiner

*Primary Examiner* — Paul N Dickson
*Assistant Examiner* — Barry Gooden, Jr.
(74) *Attorney, Agent, or Firm* — Brinks Hofer Gilson & Lione

(57) ABSTRACT

There is provided a guide plate for a side air bag. The guide plate includes a fastening member fastened to an inner surface of a vehicle body, a support member bent from a lower end of the fastening member and extending toward a passenger space of a vehicle, and a retaining member extending from a surface of the fastening member toward the passenger space of the vehicle. As the guide plate prevents a side air bag tube from being deployed in an upward direction, force for deploying the side air bag tube is not spread but concentrated to allow the side air bag tube to be properly deployed by opening a head liner.

7 Claims, 15 Drawing Sheets

Fig 10
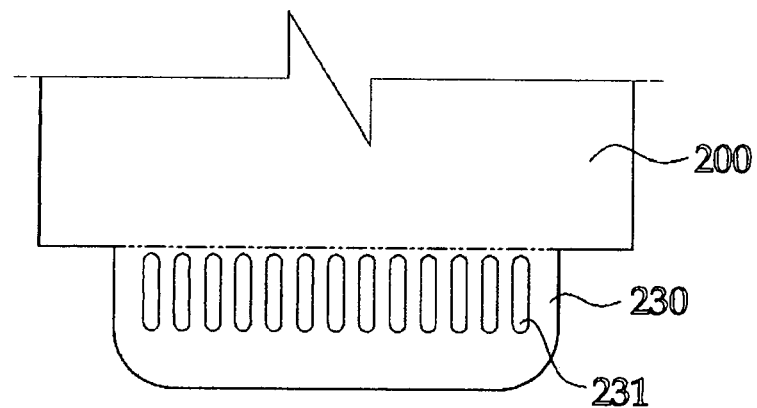
(a)
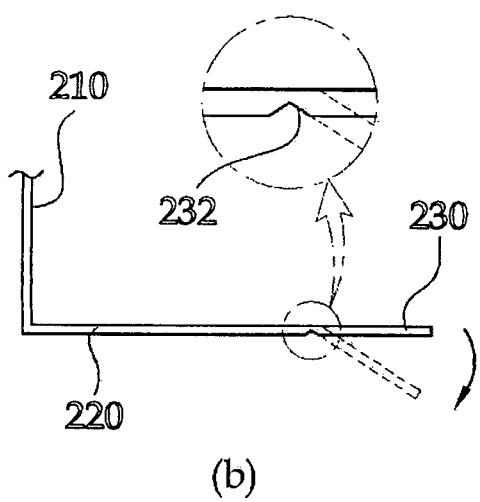
(b)
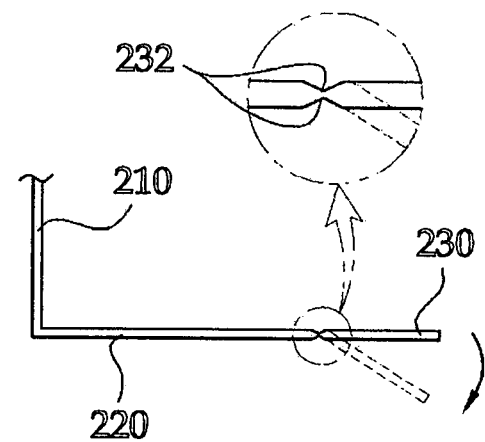
(c)

GUIDE PLATE FOR SIDE AIR BAG

CROSS-REFERENCE TO RELATED APPLICATION

This application claims the benefit of Korean Utility Model Application No. 2006-0008880 filed on Apr. 4, 2006, No. 2006-0010396 filed on Apr. 18, 2006 and No. 2006-0010487 filed on Apr. 19, 2006, the disclosure of which is hereby incorporated herein by reference in its entirety.

BACKGROUND OF THE INVENTION

1. Technical Field

The present invention relates to a guide plate for a side air bag, and, more particularly, to a guide plate for a side air bag, which prevents a side air bag from being upwardly deployed so as to allow it to be easily deployed in a downward direction, and ensures sequential deployment of a side air bag tube when the side air bag is deployed.

2. Discussion of Related Art

As is generally known in the art, in an air bag for an automotive vehicle, a sensor is provided to sense impact force upon occurrence of a collision or a sudden stop during high speed running. Therefore, as a signal is transmitted from the sensor depending upon the level of a shock to be applied to the human body, gas is supplied into and quickly inflates an air bag tube to protect a driver or a passenger from being injured.

While the air bag may not operate once throughout the life span of a vehicle, it must properly operate upon occurrence of an accident and must not operate when its operation is not required. Therefore, the air bag is a safety device which requires a high degree of operational reliability.

The air bag is usually installed in each of a steering wheel for a driver's seat and an instrument panel for a passenger's seat. Upon occurrence of a collision, the air bag operates by an impact sensor and an electronic control unit (ECU) and cooperates with a safety belt to protect an occupant from being injured.

If a collision occurs, the impact sensor transmits a signal to the ECU, and the ECU determines whether to operate the air bag depending upon the level of a shock. When it is necessary to operate the air bag, an inflator is actuated and an air bag tube is inflated.

The inflator is connected to the air bag tube which is held in a folded state. As the ECU actuates the ignitor of the inflator, an ignition agent ignites, and a gas generator burns to generate gas. As a consequence, a large amount of gas, which is instantaneously generated, is introduced into the air bag tube, and the air bag tube is quickly inflated.

Meanwhile, if a side collision occurs, a roof side rail portion is severely deformed and is significantly intruded into a passenger space to decrease the size of the passenger space, by which an occupant's head injury rating increases. Therefore, recently, a provision is provided to protect an occupant from a side collision.

An air bag module, which is provided on a side of a vehicle, is generally called a side air bag or a curtain air bag and is installed alongside the roof liner of the vehicle.

The side air bag extends alongside a roof beam constituting the roof of the vehicle from a front pillar through a center pillar to a rear pillar. The side air bag operates according to the same principle as the front air bag in a manner such that a side air bag tube can be deployed depending upon the level of a shock when a side impact is applied to a vehicle.

A side air bag assembly comprises a side air bag which is installed inward of a roof side rail, a center pillar trim which is installed below the roof side rail, a head liner which is installed facing the inside space of the vehicle to be bent upon deployment of the side air bag, and a guide unit for guiding the deployment of the side air bag.

Hereafter, the construction of a side air bag will be concretely described with reference to FIG. 1.

Referring to FIG. 1, a conventional side air bag comprises a side air bag 12 which is installed inward of a roof side rail 10, a center pillar trim 13 which is installed below the roof side rail 10, a head liner 14 which is installed facing the inside space of a vehicle to be bent upon deployment of the side air bag 12, and a guide unit 15 for guiding the deployment of the side air bag 12.

The guide unit 15 is arranged below the side air bag 12 and is installed to be secured to inside of the center pillar trim 13. The guide unit 15 is composed of a guide part 16 for guiding the deployment of the side air bag 12, a fastening member 18 which is fastened to inside of the center pillar trim 13, and a connection part 17 which connects the guide part 16 and the fastening member 18 with each other.

In the conventional side air bag, since an inside guide structure is deformed by an external shock, the deployability of the side air bag is degraded. Also, since separate means for restraining the side air bag from being upwardly deployed is not provided, force is spread and it is difficult to bend the head liner so as to deploy the side air bag. Further, since a reinforcing part is not formed on either side of the side air bag, it is difficult to sequentially deploy the side air bag.

Moreover, as the side air bag is not properly guided into the inside space, that is, the passenger space of the vehicle, the side air bag is likely to be deployed inside the center pillar trim. Furthermore, when the side air bag is deployed, because it is likely to interfere with the center pillar trim, it is not easy to sequentially deploy the side air bag.

As a consequence, because a procedure for deploying the side air bag cannot be smoothly implemented, proper operation of the side air bag cannot be ensured, as a result of which the operational reliability of the side air bag is deteriorated.

Another side air bag for protecting a vehicle occupant from a side impact will be described below with reference to FIGS. 2 and 3.

Referring to FIGS. 2 and 3, a side air bag (hereinafter, simply referred to as an "air bag") 30 is installed inside of between a roof panel (not shown) and a head liner 24 to be deployed into the passenger space of a vehicle.

The air bag 30 installed in this way has an inflator 20 at one end thereof. The inflator 20 is controlled by an ECU (not shown) depending upon the level of a shock upon occurrence of a side collision to inject a large amount of gas under a high pressure into an air bag tube 36.

A plurality of inner panels 26 and reinforcing brackets 28 are placed between the roof panel and the head liner 24. The head liner 24 is installed next to a door trim and a center pillar trim 22. The end of the head liner 24 is formed with an engagement lip 24a which is bent like a step toward the inner panel 26, and the upper end of the center pillar trim 22 is overlapped with the engagement lip 24a.

The air bag 30 is placed adjacent to the interface between the head liner 24 and the center pillar trim 22 which are installed as described above.

The air bag 30 has a housing 32. One end of the housing 32 is formed with a mounting part 32a which is bolted to the inner panel 26. The air bag tube 36 to be deployed by the inflator 20 is received in the housing 32 in a folded state. The housing 32 has at one side thereof a door 32b to be opened by the air bag tube 36 upon deployment of the air bag tube 36.

When the door 32b is opened by the air bag tube 36 upon deployment of the air bag tube 36, as the three sides of the door 32b are freed from the housing 32, the door 32b is rotated (clockwise when viewed in FIG. 3) and is brought into contact with the upper end of the center pillar trim 22, as a result of which the space between the center pillar trim 22 and the inner panel 26 is closed and the deployment of the air bag 30 is properly guided.

In this way, the air bag tube 36 being deployed is prevented from being introduced into the space between the center pillar trim 22 and the inner panel 26.

A guide plate 34 is installed adjacent to the lower surface of the housing 32 which faces the center pillar trim 22. When the air bag tube 36 is deployed, the guide plate 34 is brought into contact with the inner panel 26 to limit the rotation of the lower wall of the housing 32 and the door 32b. Thus, the guide plate 34 causes the door 32b to be stably held on the upper end of the center pillar trim 22.

In greater detail, when the air bag tube 36 is deployed, the upper end of the door 32b is detached from the housing 32, and the lower wall of the housing 32 is pushed downward to be rotated clockwise. Thereafter, the guide plate 34, which is positioned adjacent to the lower wall of the housing 32, is brought into contact with the inner panel 26 and limits the rotation amount of the lower wall of the housing 32 and the door 32b. Hence, the door 32b can be stably held on the upper end of the center pillar trim 22, and the space between the center pillar trim 22 and the inner panel 26 is closed, so that the air bag tube 36 is prevented from being introduced into the space between the center pillar trim 22 and the inner panel 26.

Accordingly, when the air bag tube 36 is deployed, as shown in FIG. 3 by the phantom line, the space between the center pillar trim 22 and the inner panel 22 is closed by the guide plate 34 and the door 32b of the housing 32. Thus, the air bag 30 being deployed is not introduced into the space between the center pillar trim 22 and the inner panel 26 and is normally deployed into the passenger space of the vehicle, whereby an occupant's side portion, particularly, head portion can be effectively protected.

When the door 32b is opened as described above, the end of the head liner 24 is detached from the upper end of the center pillar trim 22 and is bent as shown in FIG. 3 by the phantom line, thereby defining an opening through which the air bag tube 36 can be deployed.

However, in this type of side air bag, since the guide plate 34 is simply formed of a plate while not being sufficiently considered in its strength, when the air bag tube 36 is deployed, the guide plate 34 is likely to be rotated with the lower wall of the housing 32 and destroyed to be touched with the inner panel 26 by the pressure of gas.

Thereupon, as the air bag tube 36 is introduced and deployed into the space between the center pillar trim 22 and the inner panel 26, a problem is caused in that it is difficult to properly protect the occupant. Also, a serious problem is caused in that, if the guide plate 34 is destroyed, it is impossible to replace the guide plate 34.

In order to cope with these problems, another guide plate for a side air bag has been disclosed in the art.

In this disclosure, the side air bag has an air bag housing in which an air bag tube is received and which has a door to be opened by the air bag tube. The air bag housing is installed an inner panel near the interface between a center pillar trim and a head liner. The guide plate has a side wall which is fastened to the inner panel by fastening means, and the lower end of the guide plate is bent to form a support member for supporting the lower surface of the air bag housing.

Due to this configuration, the guide plate can more stably guide the introduction of the air bag tube being deployed into the passenger space of the vehicle. Also, when the support member of the guide plate is destroyed, since the guide plate can be replaced with new one, repair and maintenance can be easily conducted.

Nevertheless, since the width between the head liner and the inner panel differs depending upon the kind of a vehicle and the width of the lower wall of the air bag housing differs depending upon a manufacturer of an air bag, a guide plate should be separately manufactured in conformity with the kind and the manufacture of a vehicle.

SUMMARY OF THE INVENTION

Accordingly, the present invention has been made keeping in mind the above problems occurring in the prior art, and an object of the present invention is to provide a guide plate for a side air bag which prevents force from being spread in an upward direction and guides it to be applied in a downward direction, thereby allowing a head liner to be easily opened.

Another object of the present invention is to provide a guide plate for a side air bag tube which ensures sequential deployment of a side air bag tube.

Another object of the present invention is to provide a guide plate for a side air bag which renders stability upon deployment of the side air bag tube received in a side air bag.

Another object of the present invention is to provide a guide plate for a side air bag which can be applied to various kinds of vehicles.

Still another object of the present invention is to provide a guide plate for a side air bag which is prevented from being destroyed upon deployment of a side air bag tube.

Still further object of the present invention is to provide a guide plate for a side air bag which enables the door of an air bag housing to stably secure a deployment angle and absorbs impact force when a side air bag tube is initially deployed.

An exemplary embodiment of the present invention provides a guide plate for a side air bag, comprising a fastening member fastened to an inner surface of a vehicle body; a support member bent from a lower end of the fastening member and extending toward a passenger space of a vehicle; and a retaining member extending from the fastening member at the upper part of the support member toward the passenger space of the vehicle.

An extended member may be integrally formed on one lengthwise end of the support member.

Extended members may be respectively and integrally formed on both lengthwise ends of the support member.

An extended retaining member is integrally formed on one lengthwise end of the retaining member to extend toward an inflator.

It is preferred that extended retaining members be respectively and integrally formed on both lengthwise end of the retaining member.

An engagement member may be formed by being bent on a distal end of the retaining member.

A guide member is formed by being bent on a distal end of the support member.

Another exemplary embodiment of the present invention provides a guide plate for a side air bag, including a fastening member fastened to an inner surface of a vehicle body and a support member bent from a lower end of the fastening member to support a lower surface of the side air bag, the guide plate comprising a reinforcing support member extending from a distal end of the support member toward a passenger space of a vehicle, to support an air bag housing when an air bag tube received in the side air bag is deployed.

Another exemplary embodiment of the present invention provides a guide plate for a side air bag, including a fastening member fastened to an inner surface of a vehicle body and a support member bent from a lower end of the fastening member to support a lower surface of the side air bag, the guide plate comprising a reinforcing support member capable of being moved toward the passenger space of the vehicle by guide means on a distal end of the support member toward a passenger space of a vehicle, to support an air bag housing when an air bag tube received in the side air bag is deployed.

The guide means comprises through-holes which are defined adjacent to the distal end of the support member, slots which are defined through the reinforcing support member, correspond to the respective through-holes and extend toward the passenger space of the vehicle, and bolts and nuts which are locked with each other through the through-holes and the slots.

A plurality of holes are defined through the reinforcing support member to be arranged with one another in a lengthwise direction of vehicle.

The holes defined through the reinforcing support member comprise slots.

A notch is formed on a lower surface or each of upper and lower surfaces of the reinforcing support member to extend in the lengthwise direction of vehicle.

A coating layer made of synthetic resin or fabric is formed on an outer surface of the reinforcing support member.

Still another exemplary embodiment of the present invention provides a guide plate for a side air bag, comprising a fastening member fastened to an inner surface of a vehicle body; a support member bent from a lower end of the fastening member toward a passenger space of a vehicle; and a bent member formed on a distal end of the support member.

The bent member is formed in the shape of 'L'.

The bent member is formed to have an inclined shape.

The bent member is positioned higher than or at the same height as an upper end of a center pillar trim.

A plurality of slots are defined through the guide plate.

A coating layer is formed on outer surfaces of the support member and the bent member.

The coating layer is made of synthetic resin or fabric.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 10(a) through 10(c) are a plan view and sectional views illustrating three variations of the through-hole shown in FIG. 9;

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention. Like numbers refer to like element.

First Embodiment

Hereafter, the construction of a guide plate for a side air bag in accordance with a first embodiment of the present invention will be described with reference to FIGS. 4 through 6.

Figure 1:
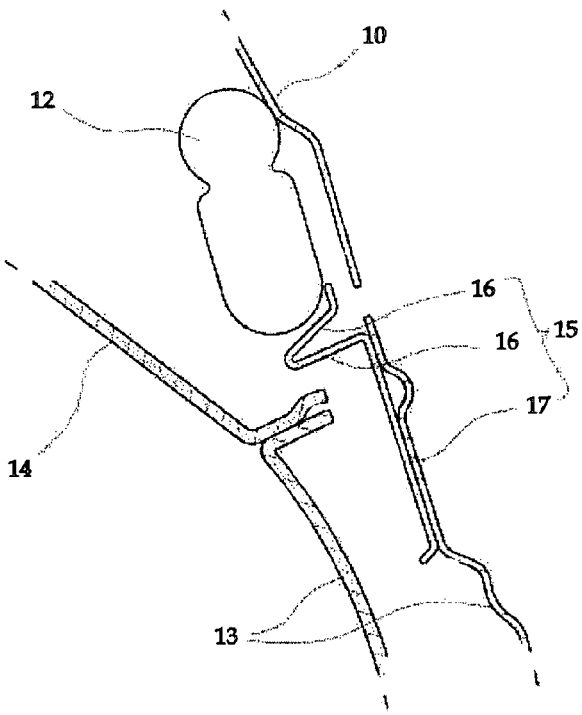
FIG. 1 is a sectional view illustrating the installation structure of a conventional side air bag.
Figure 2:
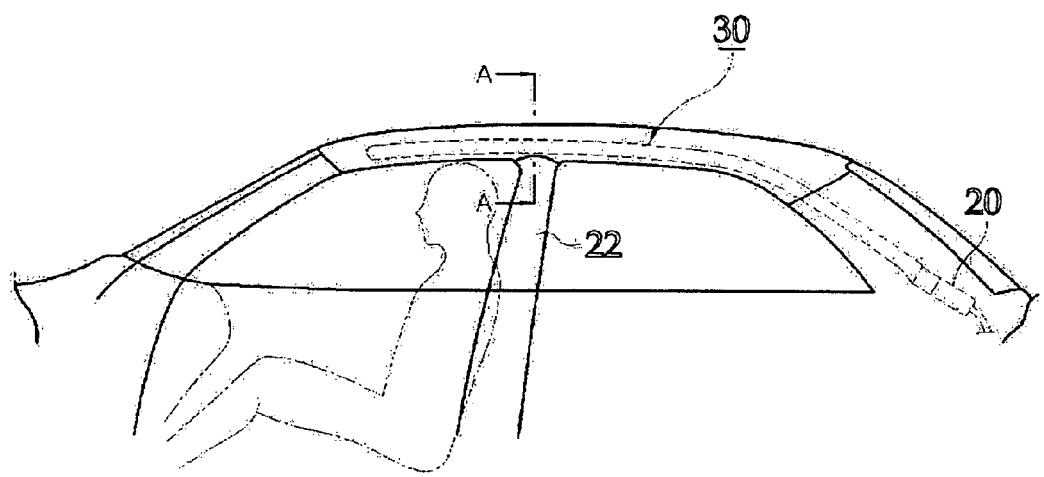
FIG. 2 is a side view illustrating a vehicle to which the conventional side air bag is mounted.
Figure 3:
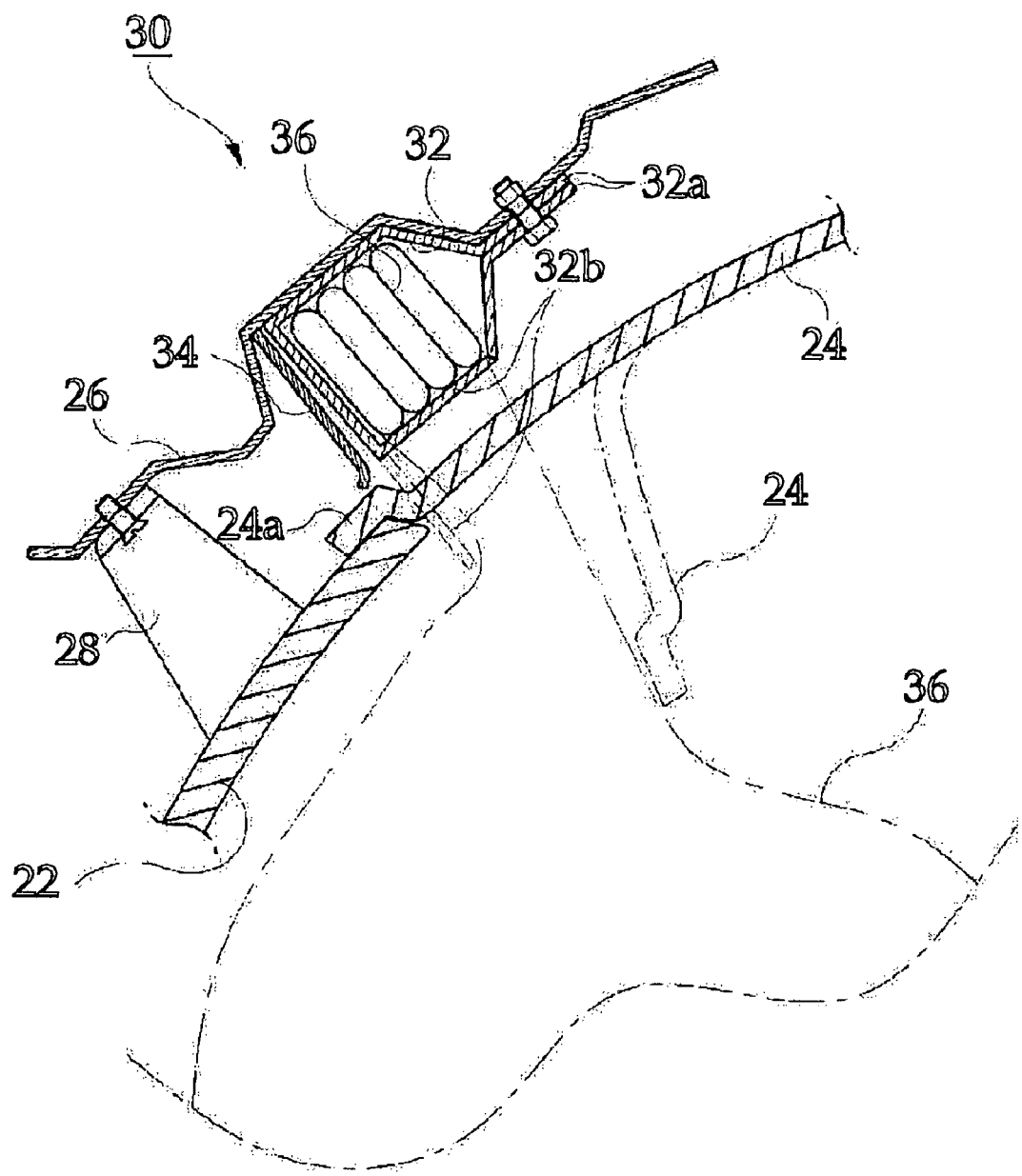
FIG. 3 is a sectional view taken along the line A-A of FIG. 2.
Figure 4:
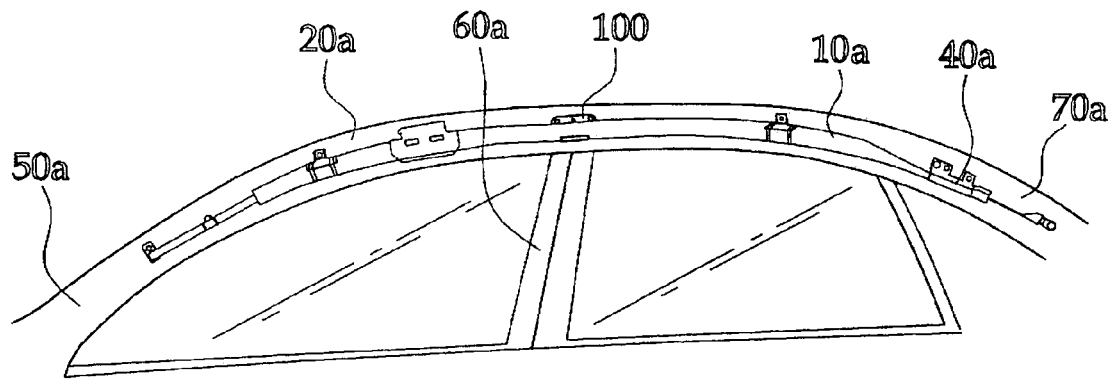
FIG. 4 is a side view illustrating the installation position of a guide plate for a side air bag in accordance with a first embodiment of the present invention.

Referring to FIG. 4, a side air bag 10a is installed inside a roof side panel 20a. The side air bag 10a has a front end which is secured to a front pillar 50a by a buckle and a rear end which has an inflator 40a and is connected to a rear pillar 70a.

A guide plate 100 according to the present invention is installed on the roof side panel 20a above a center pillar 60a. A side air bag housing 10b is fitted between a retaining member 120 and a support member 130 of the guide plate 100.

While not shown in the drawings, the side air bag 10a includes a sensor for sensing a collision of a vehicle and an electronic control unit for operating the inflator 40a in response to a signal from the sensor.

Figure 5:
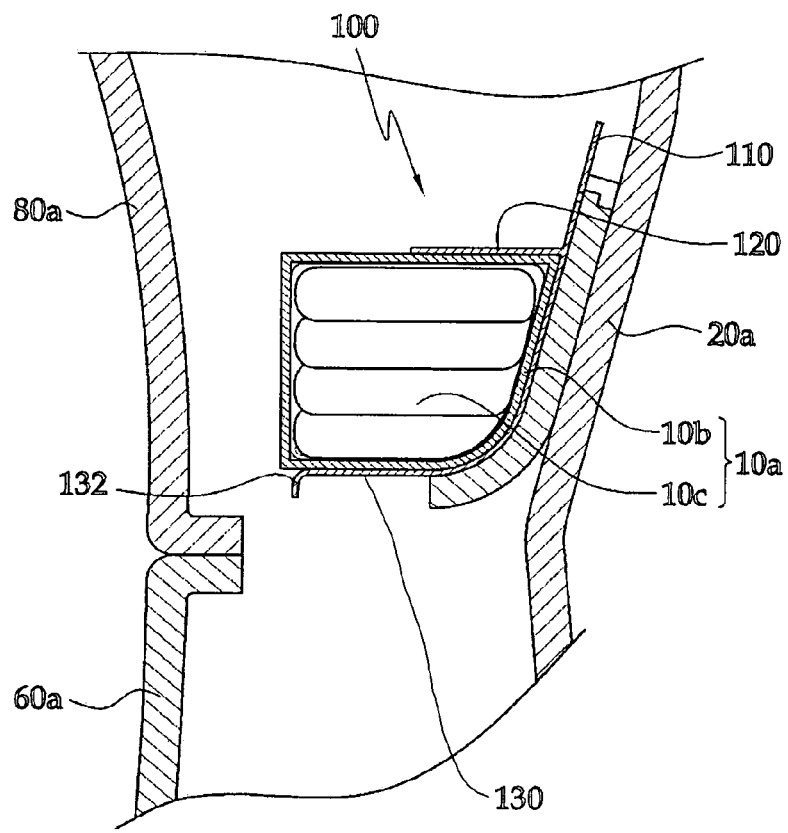
FIG. 5 is a sectional view illustrating the installation structure of the guide plate for a side air bag in accordance with the first embodiment of the present invention.
Figure 6:
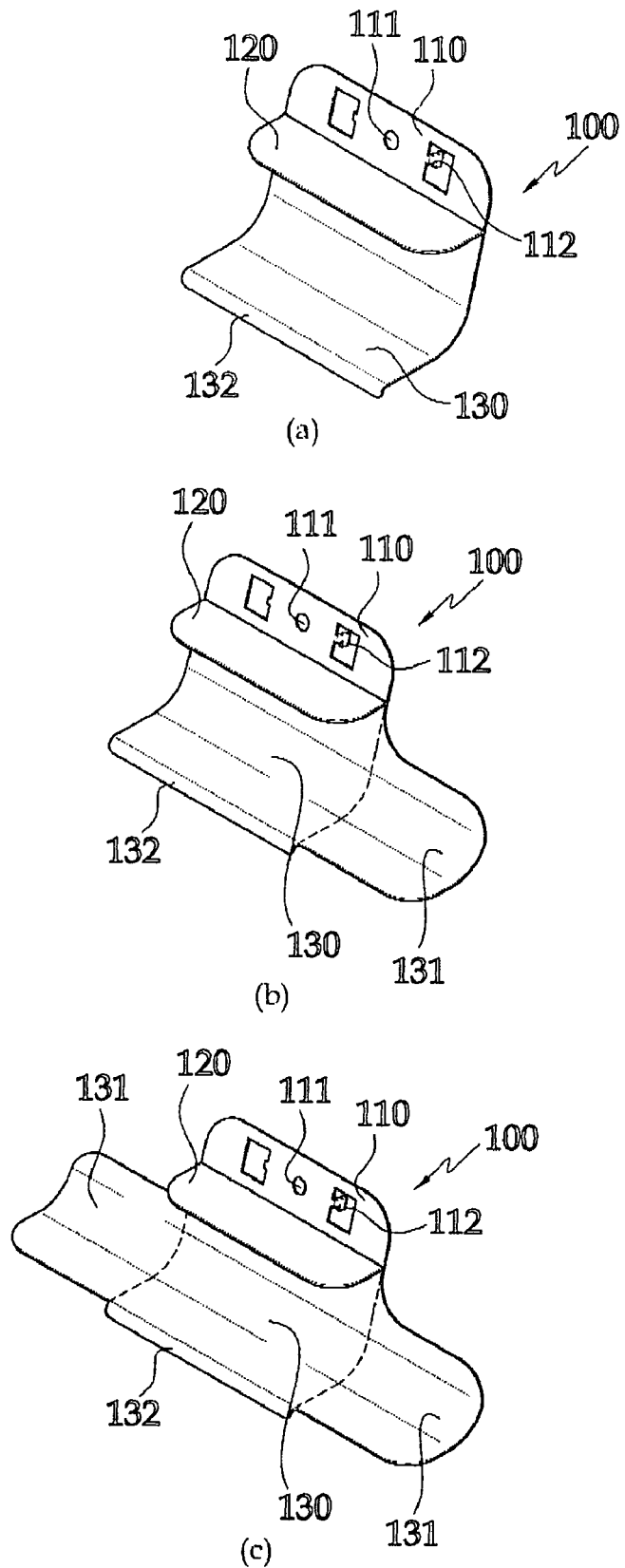
FIGS. 6(a) through 6(c) are perspective views each illustrating the guide plate for a side air bag in accordance with the first embodiment of the present invention.

FIGS. 5 and 6 illustrate in detail the guide plate for a side air bag according to the present invention and the installation structure thereof.

As shown in these drawings, the guide plate 100 according to the present embodiment is placed between the roof side panel 20a and a head liner 80a and is fastened to the roof side panel 20a.

The guide plate 100 includes a fastening member 110 and the support member 130 which is bent at the lower portion of the fastening member 110 to be curved and extends toward the passenger space of the vehicle. The guide plate 100 is fastened to the roof side panel 20a by a bolt which is inserted through a mounting hole 111 defined through the fastening member 110.

Engagement tongues 112 are formed at both sides of the mounting hole 111 and are engaged into engagement grooves (not shown) which are defined in the roof side panel 20a. The engagement tongues 112 cooperate with the bolt to prevent the guide plate 100 from being rotated.

The side air bag 10a is securely held between the support member 130 including at least one extended member 131 and the retaining member 120. Upon occurrence of a side collision, the side air bag 10a is deployed into the passenger space of the vehicle by opening the head liner 80a.

Referring to FIG. 5, the distal end of the support member 130 is formed with a guide member 132 which is bent downward. Due to the presence of the guide member 132, the side air bag 10a is prevented from being deployed between the roof side panel 20a and the head liner 80a.

As shown in FIG. 6(a), the guide plate 100 includes the fastening member 110 which is fastened to the roof side panel 20a, the support member 130 which is bent at the lower portion of the fastening member 110 in such a way as to define a slow curve, and the retaining member 120 which projects from the upper portion of the fastening member 110.

The fastening member 110 is defined with the mounting hole 111 through which the bolt is inserted to mount the fastening member 110 to the roof side panel 20a. Square holes are defined on both sides of the mounting hole 111, and the engagement tongues 112 are formed by being bent in the square holes and project from the surface of the fastening member 110.

The retaining member 120 is formed below the mounting hole 111 to project from the surface of the support member 130 toward the passenger space of the vehicle. The retaining member 120 functions to prevent force from being spread in an upward direction and concentrate the force to a downward direction when the side air bag 10a is deployed, so that the head liner 80a can be easily opened.

The support member 130 is bent from the lower end of the fastening member 110 to define a slow curve. In order to facilitate the sequential deployment of an air bag tube 10c of the side air bag 10a, an extended member 131 can be formed on one lengthwise end of the support member 130 to extend toward the inflator 40a (see FIG. 6(b)), or extended members 131 can be formed on both lengthwise ends of the support member 130 (see FIG. 6(c)).

Therefore, separate means for holding the side air bag 10a is not required.

The guide member 132 is bent substantially perpendicularly from the distal end of the support member 130 to guide the side air bag 10a to be deployed into the passenger space of the vehicle by pushing and opening the head liner 80a, thereby preventing the side air bag 10 from being deployed inside the center pillar 60a.

Figure 8:
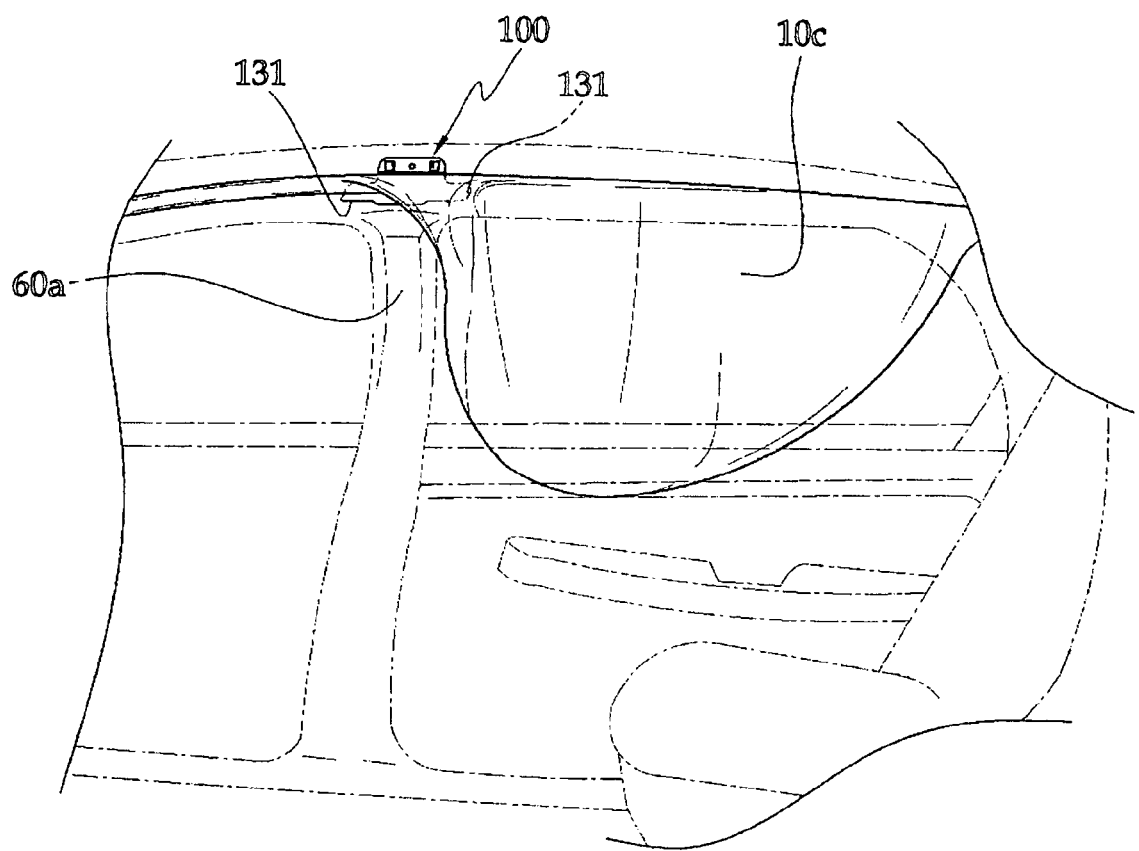
FIG. 8 is a side view illustrating the deployment pattern of the side air bag having the guide plate in accordance with each of the first and second embodiments of the present invention.

Herein below, a deploying procedure of the side air bag including the guide plate according to the present invention will be described with reference to FIG. 8.

First, as impact force is applied to the vehicle, the inflator is actuated in response to a signal from the sensor. Then, as gas is supplied into the side air bag tube 10c, the side air bag tube 10c is instantaneously inflated.

At this time, the retaining member 120 which projects from the surface of the fastening member 110 prevents the side air bag from being deployed in the upward direction and force from being spread, so that the side air bag tube 10c can be deployed by easily pushing and opening the head liner 80a.

Also, due to the fact that the guide plate 100 has at least one extended member 131 adjacent to the center pillar 60a, the side air bag tube 10c can be reliably deployed into the passenger space of the vehicle, and does not interfere with the center pillar 60a, by which the sequential deployment of the side air bag 10a can be ensured.

The guide member 132 restrains the side air bag 10a from being deployed inside the center pillar 60a and guides the side air bag 10a to be reliably deployed into the passenger space of the vehicle while not interfering with the upper end of the center pillar 60a.

Second Embodiment

Figure 7:
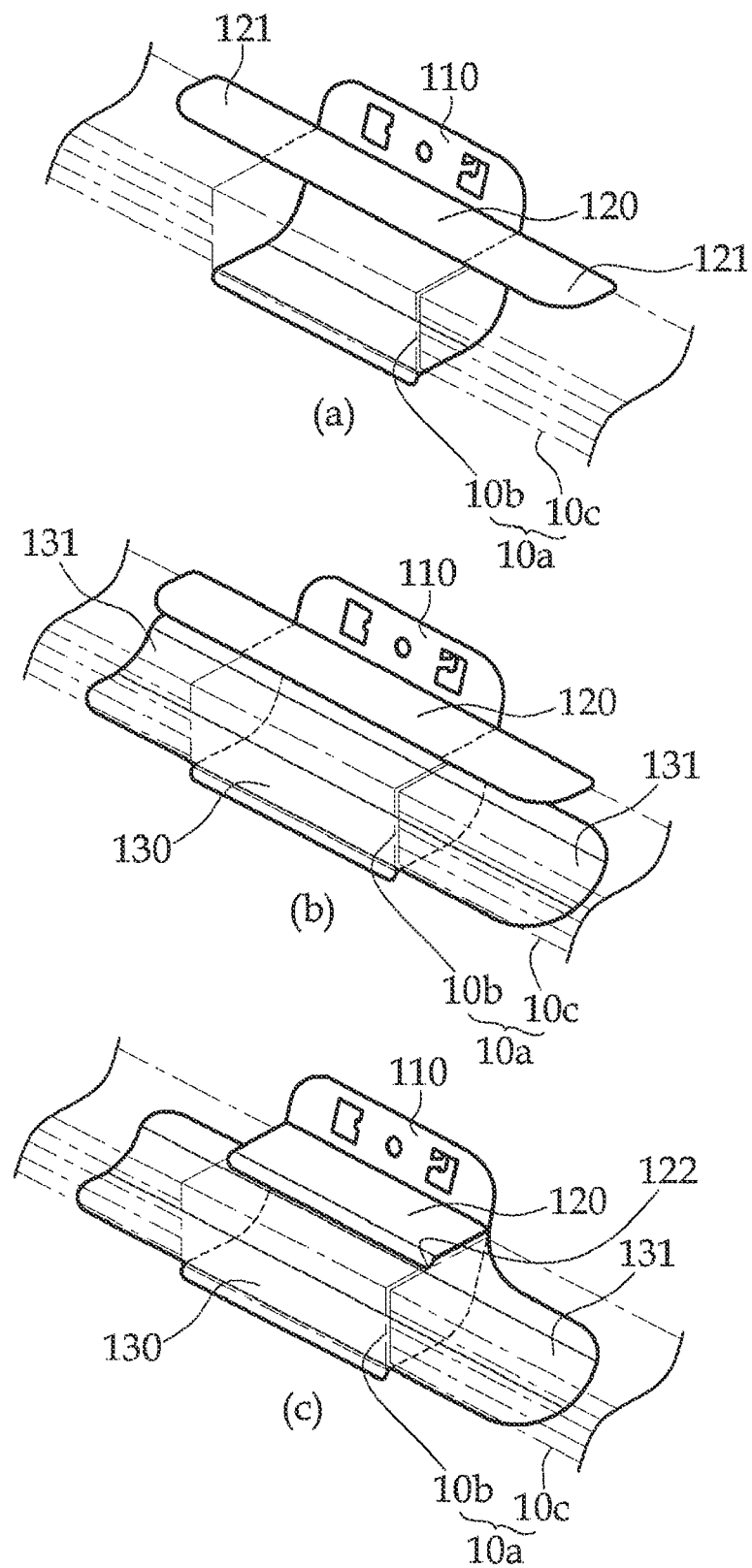
FIGS. 7(a) through 7(c) are perspective views each illustrating a guide plate for a side air bag in accordance with a second embodiment of the present invention.

FIGS. 7(a) through 7(c) illustrate constructions of the guide plate in accordance with a second embodiment of the present invention.

Referring to FIG. 7(a), the retaining member 120, which projects from the surface of the fastening member 110, has extended retaining members 121 which are respectively and integrally formed on both lengthwise ends of the retaining member 120, to prevent force from being spread in the upward direction.

Referring to FIG. 7(b), the support member 130 has the extended members 131 which are respectively and integrally formed on both lengthwise ends of the support member 130, to prevent the side air bag 10a from interfering with the center pillar 60a when being deployed.

Referring to FIG. 7(c), an engagement member 122 is formed on the distal end of the retaining member 120 to be bent in the downward direction. The engagement member 122 securely holds the side air bag housing 10b and causes the side air bag tube 10c to be reliably expanded toward the head liner 80a when being deployed.

A deploying procedure of the side air bag including the guide plate according to the second embodiment of the present invention is same as the first embodiment, and a detailed description of a deploying procedure is omitted.

Third Embodiment

A guide plate for a side air bag in accordance with a third embodiment of the present invention will be described below with reference to FIGS. 9 through 12.

Figure 11:
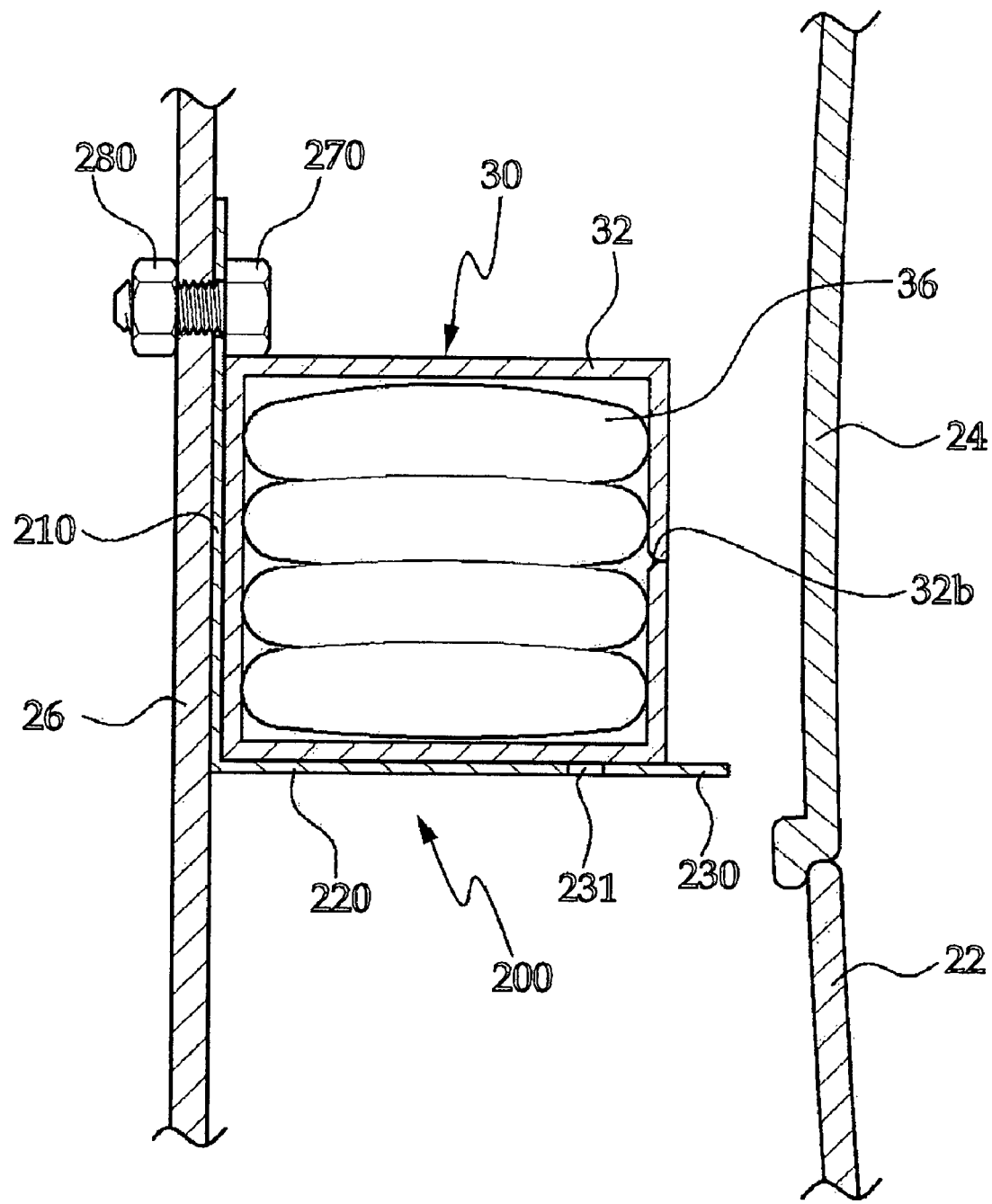
FIG. 11 is a sectional view illustrating the guide plate for a side air bag in accordance with the third embodiment of the present invention.

Referring to FIG. 11, a side air bag 30 is installed facing the passenger space of a vehicle to protect an occupant from being injured. The side air bag 30 includes an air bag tube 36 which is folded multitude of times, an air bag housing 32 for receiving the air bag tube 36, and an inflator connected to an end of the air bag tube 36 to inject gas under a high pressure into the air bag tube 36.

The air bag housing 32 has a door 32b on one sidewall thereof and a mounting portion (not shown) on the upper end thereof, which is to be fastened to an inner panel 26 by a bolt. Each guide plate 200 is installed on the air bag housing 32 at a predetermined position to support the lower surface of the air bag housing 32 (see FIG. 12).

Figure 9:
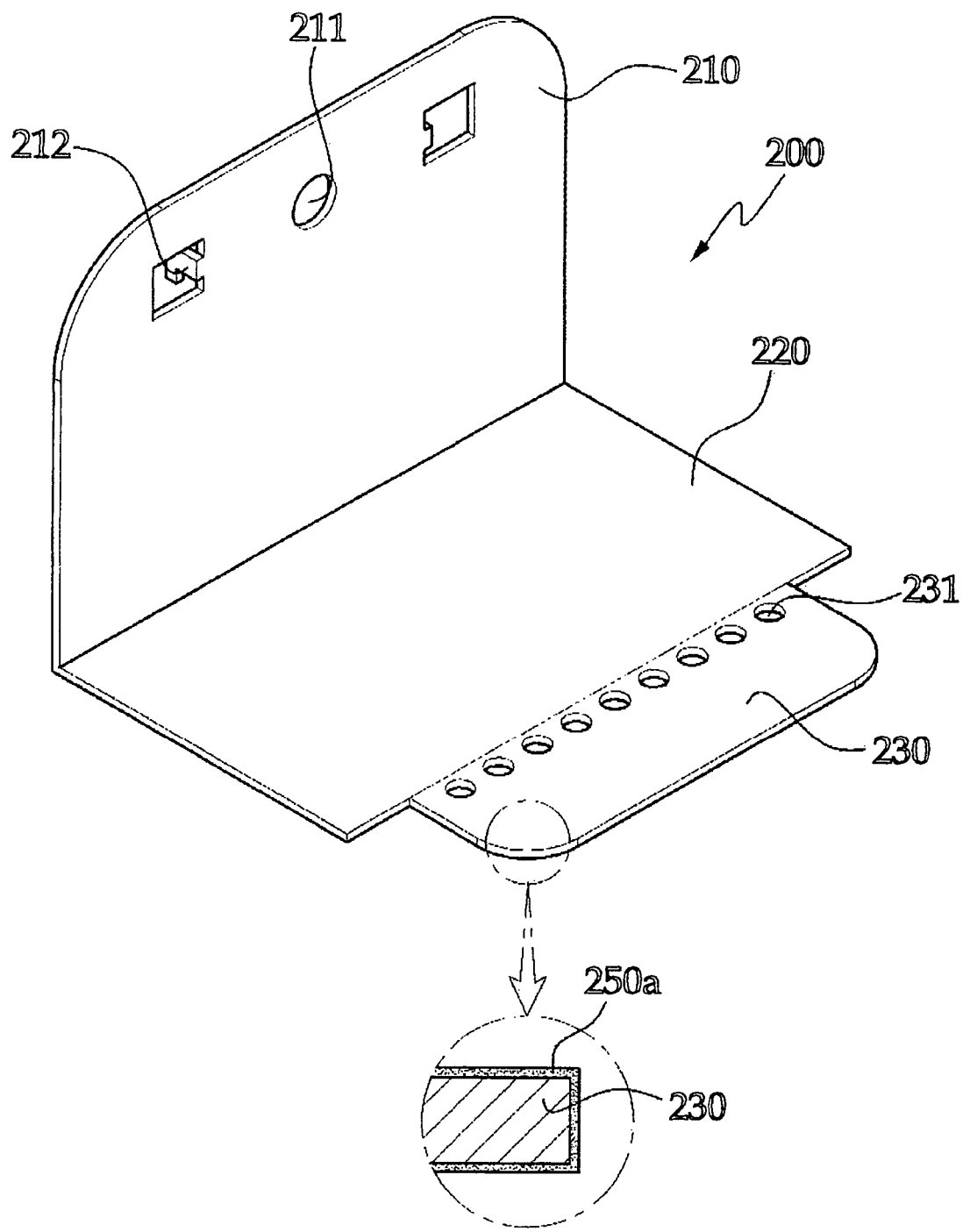
FIG. 9 is a perspective view illustrating a guide plate for a side air bag in accordance with a third embodiment of the present invention.
Figure 12:
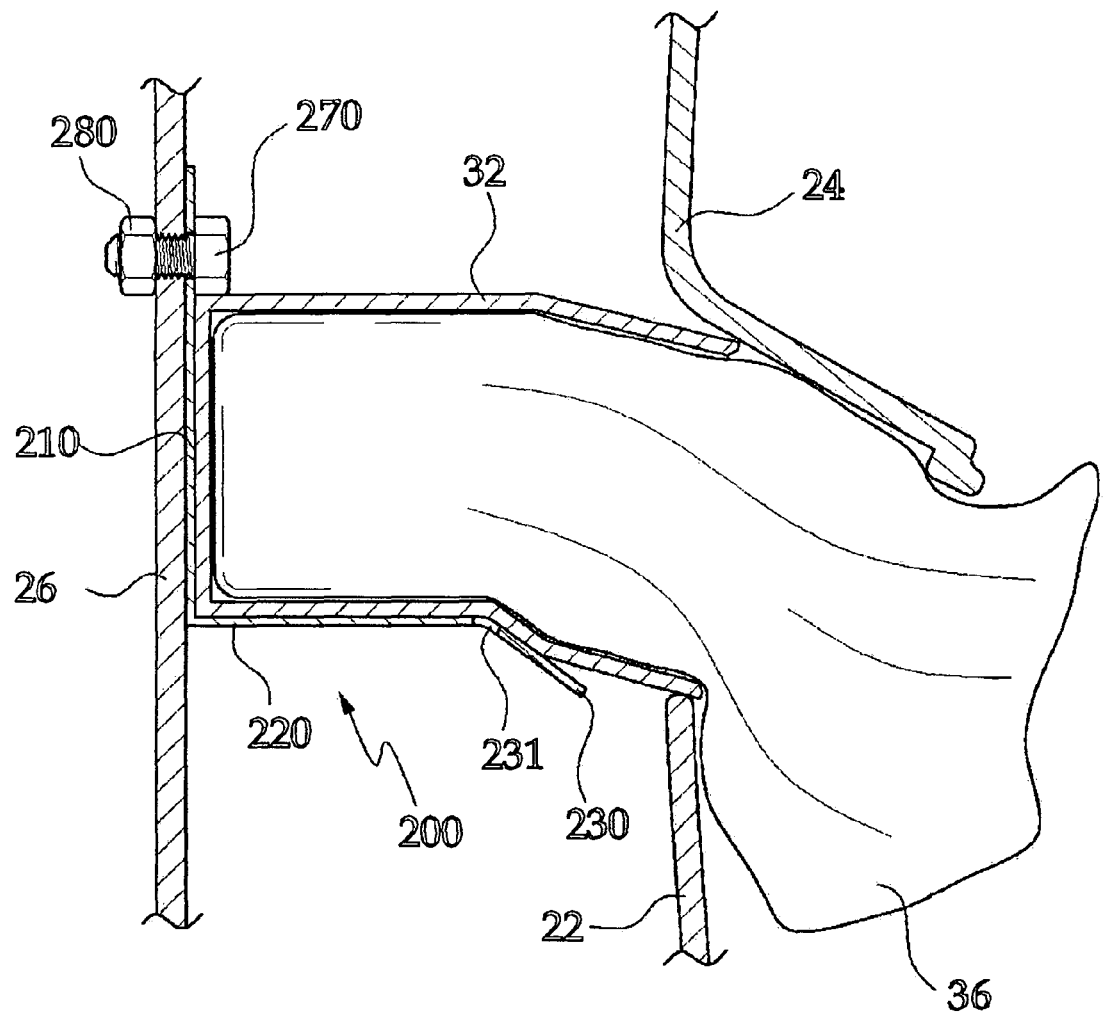
FIG. 12 is a sectional view illustrating a state in which the air bag tube of the side air bag shown in FIG. 11 is deployed.

Referring to FIGS. 9 and 12, the guide plate 200 for a side air bag 30 to support the lower surface of the air bag housing 32 of the side air bag 30 and to guide the deployment of the air bag tube 36 into the passenger space of the vehicle. The guide plate 200 includes a fastening member 210 which is fastened to the inner panel 26 of the vehicle using a bolt 270 and a nut 280, and a support member 220 which is bent from the lower end of the fastening member 210.

The fastening member 210 functions to fasten the guide plate 200 not to be moved. The fastening member 210 has a inserting hole 211 through which the bolt 270 is inserted. Engagement parts 212 each having the sectional shape of 'L' are formed by being bent on both sides of the inserting hole 211 and are engaged into the inner panel 26. The fastening member 210 has the lower end from which the support member 220 is bent.

In greater detail, with the engagement parts 212 engaged into the grooves (not shown) defined in the inner panel 26 not to be moved, by inserting the bolt 270 through the inserting hole 211 and locking the nut 280 to the bolt 270 on the rear surface of the inner panel 26, the guide plate 200 is securely fastened to the inner panel 26.

The support member 220 is horizontally bent from the lower end of the fastening member 210 and supports the lower surface of the air bag housing 32. A reinforcing support member 230 is integrally formed on and extends from the distal end of the support member 220.

The reinforcing support member 230 is to elastically support the lower portion of the door 32b of the air bag housing 32 when the air bag tube 36 received in the air bag housing 32 is deployed. The reinforcing support member 230 horizontally extends outward from the distal end of the support member 220.

In the drawing, the reinforcing support member 230 has a width which is less than that of the support member 220.

As shown in FIGS. 11 and 12, the support member 220 supports the lower surface of the air bag housing 32, and the reinforcing support member 230 supports the lower portion of the door 32b of the air bag housing 32 when the air bag tube 36 is deployed.

Therefore, since it is possible to position the guide plate 200 close to the head liner 24 due to the presence of the reinforcing support member 230, the empty space between the head liner 24 and the inner panel 26 can be minimized, and the air bag tube 36 can be more stably deployed into the passenger space of the vehicle.

The reinforcing support member 230 is defined with a plurality of holes 231 (see FIG. 9) which are arranged in the lengthwise direction of vehicle. Thus, in the event that gas under a high pressure is injected into the air bag tube 36, impact force at the time the door 32b of the air bag housing 32 is momentarily flexed and returned toward its original position can be absorbed.

It is preferred that the holes 231 comprise slots as shown in FIG. 10a and that the slots 231 be defined to extend perpendicular to the boundary line between the support member 220 and the reinforcing support member 230. Through this, since it is possible to prevent a load from being applied to one portion, the reinforcing support member 230 can be prevented from being broken.

Meanwhile, as shown in FIGS. 10(b) and 10(c), a notch 232 can be formed on the lower surface or each of the upper and lower surfaces of the reinforcing support member 230 to extend in the lengthwise direction of vehicle. The notch 232 may have a semicircular or a 'V'-shaped section.

Thus, in the event that gas under a high pressure is injected into the air bag tube 36, impact force at the time the door 32b of the air bag housing 32 is momentarily flexed and returned toward its original position can be absorbed by the notch 232.

In order to avoid damage to the air bag tube 36, it is preferred that a coating layer 250a made of synthetic resin or fabric be formed on the outer surface of the reinforcing support member 230.

Fourth Embodiment

Figure 13:
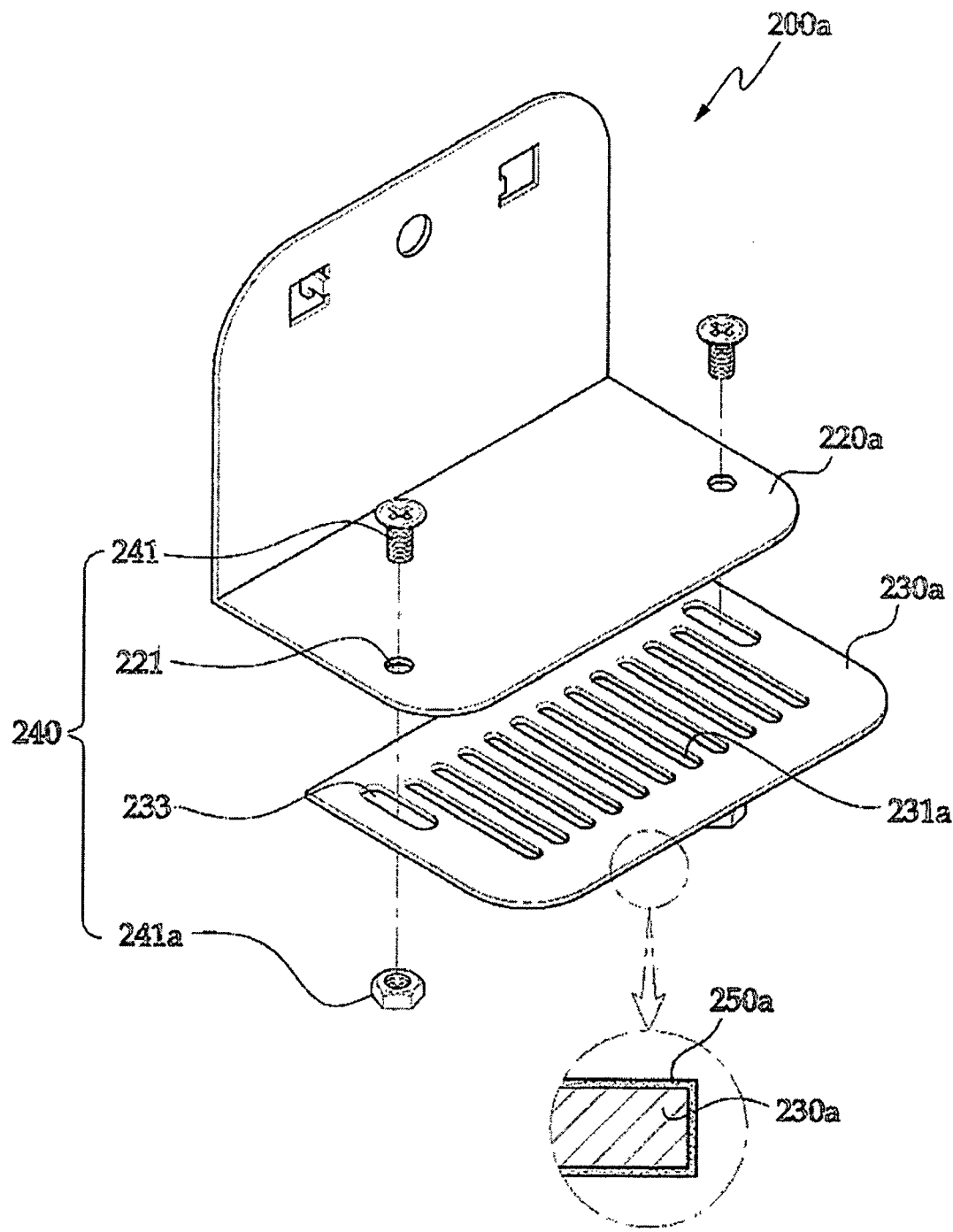
FIG. 13 is a perspective view illustrating a guide plate for a side air bag in accordance with a fourth embodiment of the present invention.

FIG. 13 illustrates the construction of a guide plate for a side air bag in accordance with a fourth embodiment of the present invention. In the following description of the fourth embodiment of the present invention, the same component elements as those of the third embodiment will be designated by the same reference numerals, and detailed explanation thereof will be omitted.

Referring to FIG. 13, a reinforcing support member 230a is provided to the distal end of the support member 220a of a guide plate 200a to elastically support the lower surface of the air bag housing 32 when the air bag tube 36 received in the side air bag 30 is deployed.

Before securely installed by guide means 240, the reinforcing support member 230a can be moved in the deployment direction of the air bag tube 36.

The guide means 240 comprises through-holes 221 which are defined through the support member 220a, slots 233 which are defined through the reinforcing support member 230a to correspond to the respective through-holes 221 and to extend perpendicular to the boundary line between the support member 220a and the reinforcing support member 230a, and bolts 241 which are inserted through the through-holes 221 and the slots 233 and locked with nuts 241a.

Therefore, since the reinforcing support member 230a can be moved along the slots 233 by tightening and loosening the bolts 241, the extending size of the reinforcing support member 230a from the support member 220a can be adjusted.

Here, in order to avoid damage to the air bag tube 36, it is preferred that a coating layer 250a made of synthetic resin or fabric be formed on the outer surface of the reinforcing support member 230a.

Fifth Embodiment

Figure 14:
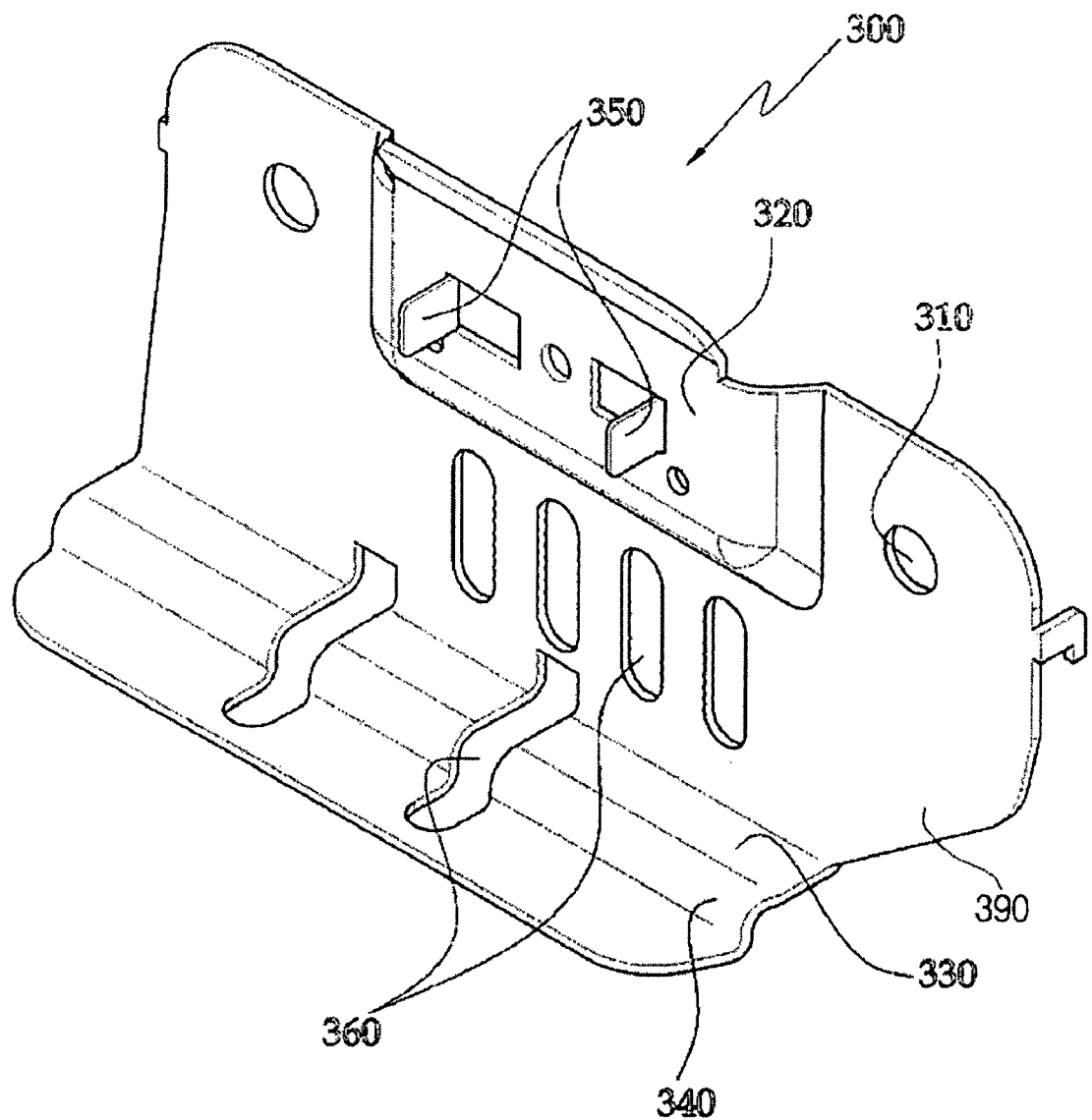
FIG. 14 is a perspective view illustrating a guide plate for a side air bag in accordance with a fifth embodiment of the present invention.
Figure 15:
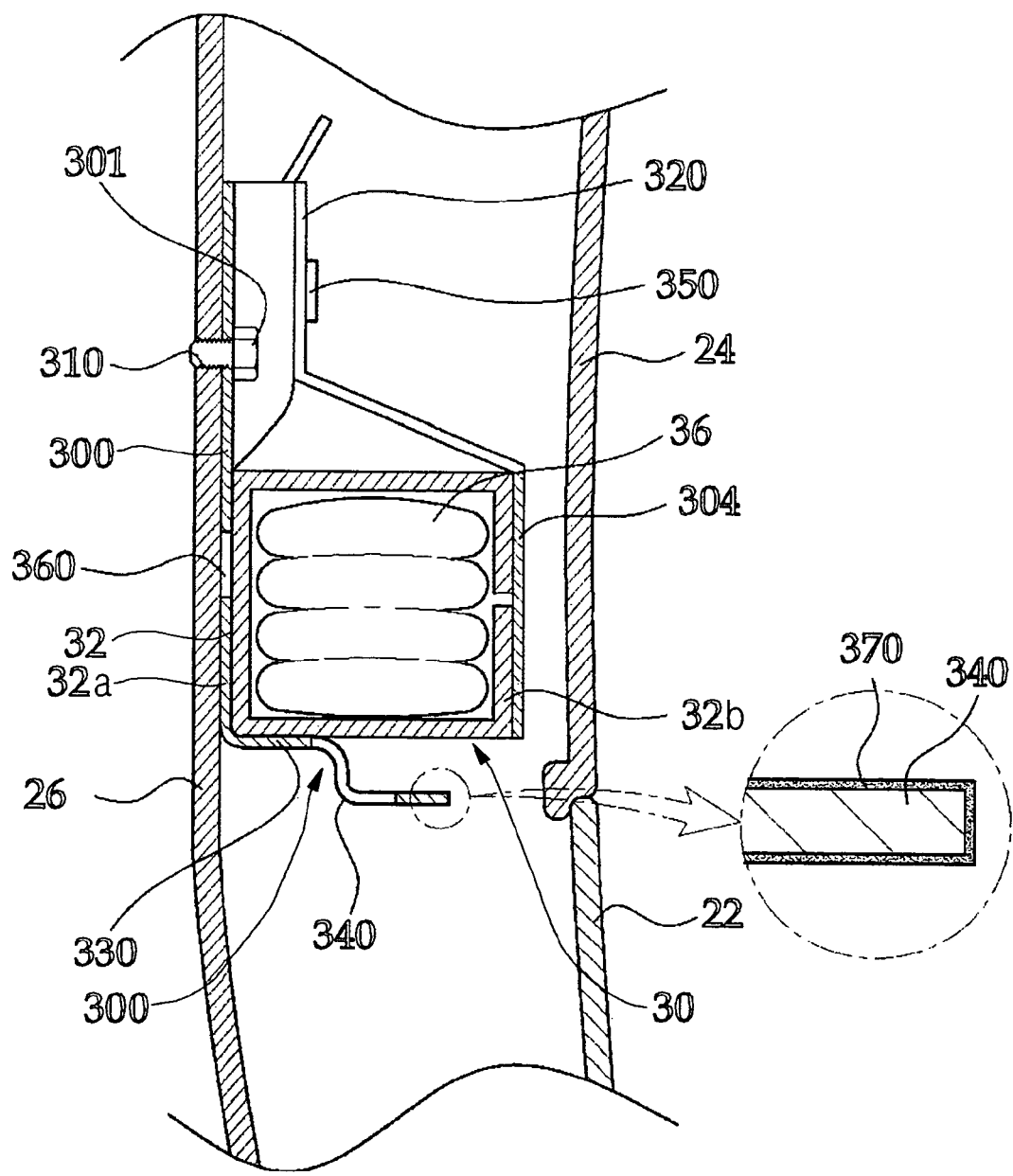
FIG. 15 is a sectional view illustrating the guide plate for a side air bag in accordance with the fifth embodiment of the present invention.
Figure 16:
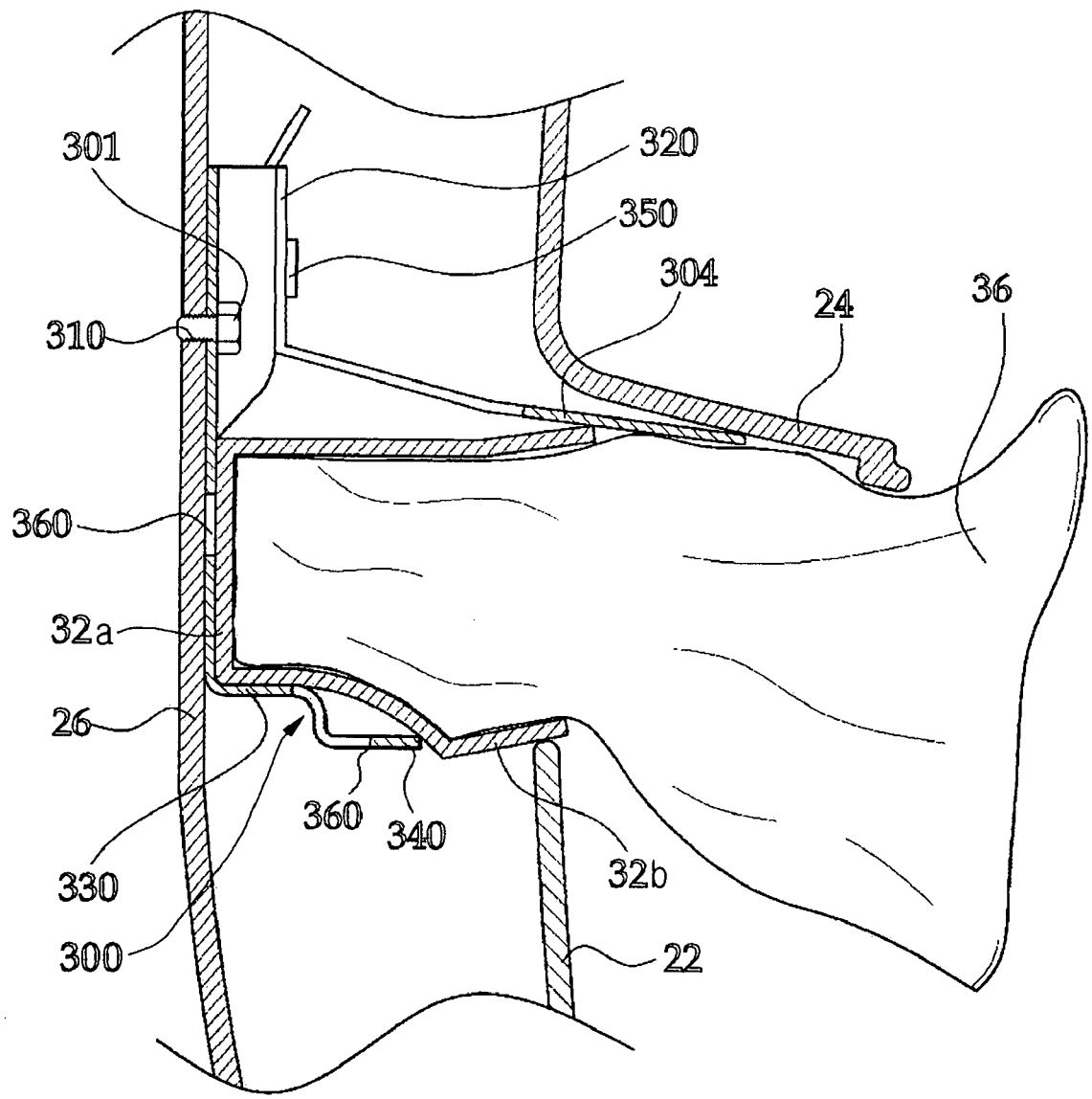
FIG. 16 is a sectional view illustrating a state in which the air bag tube of the side air bag shown in FIG. 15 is deployed.

Hereafter, the construction of a guide plate for a side air bag in accordance with a fifth embodiment of the present invention will be described with reference to FIGS. 14 through 16.

A side air bag 30 is installed facing the passenger space of a vehicle to protect an occupant from being injured. The side air bag 30 includes an air bag tube 36 which is folded multitude of times, an air bag housing 32 for receiving the air bag tube 36, and an inflator connected to an end of the air bag tube 36 to inject gas under a high pressure into the air bag tube 36.

The air bag housing 32 has a door 32b on one sidewall thereof and a mounting portion 32a on the upper end thereof, which is to be fastened to an inner panel 26 by a bolt. Each guide plate 300 is installed on the air bag housing 32 at a predetermined position to support the lower surface of the air bag housing 32 (see FIG. 15).

The guide plate 300 is made of metal and is fastened to the inner panel 26 by a fastening member 390.

The fastening member 390 has inserting holes 310 on opposite portions thereof such that the fastening member 390 can be fastened to the inner panel 26 by fastening means 301, that is, the bolts inserted through the inserting holes 310. A protruded portion 320 is formed on the fastening member 390 between the inserting holes 310 to be brought into contact with one sidewall of the air bag housing 32. A support member 330 is bent from the lower end of the fastening member 390 to support the lower surface of the air bag housing 32.

A bent member 340 is formed on the distal end of the support member 330 to have the sectional shape of 'L' and to extend in the lengthwise direction of the support member 330. Hence, in the event that the air bag tube 36 is inflated, impact force at the time the door 32b of the air bag housing is momentarily flexed and returned toward its original position can be absorbed. As a consequence, it is possible to prevent the support member 330 from being destroyed or deformed.

It is preferred that the bent member 340 be positioned higher than or at the same height as the upper end of the center pillar trim 22.

This is to prevent the air bag tube 36 from being deployed into a space between the inner panel 26 and the center pillar trim 22.

A plurality of slots 360 are defined through the guide plate 300 so that the weight and material cost of the guide plate 300 can be reduced.

Moreover, fastening pieces 350 are formed by being bent on the protruded portion 320 of the guide plate 300 such that a fastening plate 304 for fastening the air bag housing 32 can be fitted on the fastening pieces 350.

Each fastening piece 350 is formed by cutting three sides of a square pattern except one vertical side thereof using a punching machine and then by bending the cut portion through 90° about the one vertical side toward the air bag housing 32.

After the fastening pieces 350 are fitted into the grooves defined in the fastening plate 304 for fastening the air bag housing 32, the portions of the fastening pieces 350 which project out of the grooves of the fastening plate 304 are bent through 90°, whereby the fastening plate 304 can be firmly held with respect to the guide plate 300.

Herein below, the assembly and the use of the guide plate for a side air bag according to the present embodiment will be described.

First, by inserting fastening means 301 through the inserting holes 310 of the guide plate 300, the guide plate 300 is fastened to the inner panel 26.

Thereafter, by fitting the grooves of the fastening plate 304 on the fastening pieces 350 of the guide plate 300 with the side air bag 30 interposed between the fastening plate 304 and the guide plate 300, the side air bag is securely fastened.

Then, upon occurrence of a side collision, as a large amount of gas under a high pressure is supplied into the air bag tube 36 by the inflator, the air bag tube 36 is inflated, tears the door 32b of the air bag housing 32 and is deployed into the passenger space of the vehicle by opening the head liner 24.

At this time, due to the presence of the support member 330, the guide plate 300 prevents the lower portion of the door 32b from being rotated so that the air bag tube 36 is prevented from being introduced into the space between the center pillar trim 22 and the inner panel 26.

Also, due to the presence of the bent member 340 of the guide plate 300, in the event that gas under a high pressure is injected into the air bag tube 36, since the impact force at the time the lower portion of the door 32b is momentarily flexed and returned toward its original position can be absorbed, the air bag tube 36 can be more stably deployed into the passenger space of the vehicle.

Sixth Embodiment

Hereafter, the construction of a guide plate in accordance with a sixth embodiment of the present invention will be described with reference to FIG. 17. Since the present embodiment is substantially similar to the fifth embodiment, only the different features will be described.

Figure 17:
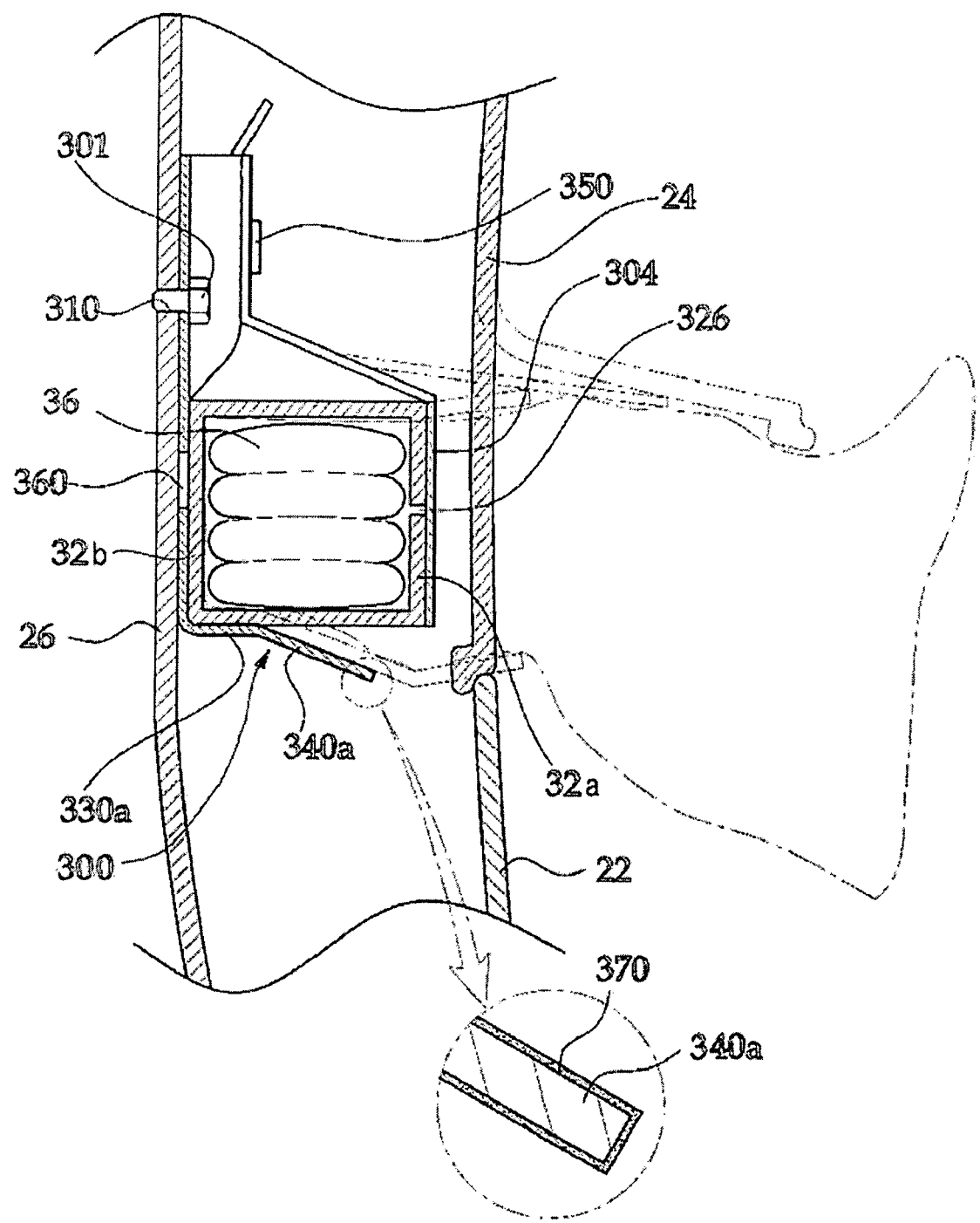
FIG. 17 is a sectional view illustrating a guide plate for a side air bag in accordance with a sixth embodiment of the present invention.

Referring to FIG. 17, the bent member 340a of the guide plate 300 according to the present embodiment is bent on the distal end of the support member 330a to have an inclined sectional shape.

The bent member 340a supports the lower portion of the door 32b of the air bag housing 32 when the door 32b is flexed. Therefore, the bent member 340a prevents the lower portion of the door 32b from being destroyed or deformed when it is momentarily flexed.

It is preferred that a coating layer 370 be formed on the outer surface of the guide plate 300. The coating layer 370 is made of synthetic resin or fabric to deposit a thin film on the outer surfaces of the support member 330a and the bent member 340a of the guide plate 300, thereby preventing the air bag tube from being torn by a sharp edge, etc.

As is apparent from the above description, the guide plate for a side air bag according to the present invention provides advantages as described below. First, as a guide plate prevents a side air bag tube from being deployed in an upward direction, force for deploying the side air bag tube is not spread but concentrated to allow the side air bag tube to be properly deployed by opening a head liner.

The guide plate is formed with at least one extended member. The extended member guides the deploying direction of the side air bag tube so that the side air bag tube does not interfere with a center pillar when it is deployed, whereby the sequential deployment of the side air bag tube is ensured.

Due to the presence of the guide member of the guide plate, the side air bag can be reliably deployed into the passenger space of a vehicle.

Therefore, according to the construction of the present invention, since separate parts for properly holding the side air bag are not needed when mounting the side air bag, manufacturing cost and time can be decreased.

Further, in the guide plate for a side air bag according to the present invention, due to the fact that a reinforcing support member is provided to a support member to extend therefrom, the side air bag tube can be more stably deployed into the passenger space of the vehicle.

Since a plurality of slots are defined through the reinforcing support member to extend in the widthwise direction thereof, in the case where gas under a high pressure is injected into the air bag tube, impact force at the time the door of a side air bag housing is momentarily flexed and returned toward its original position can be absorbed.

Because the reinforcing support member can be moved and then secured with respect to the support member, the width of the reinforcing support member can be adjusted, whereby the guide plate for a side air bag according to the present invention can be applied irrespective of kinds of a vehicle and a side air bag.

Further, by the fact that a coating layer is formed on the outer surface of the reinforcing support member, the air bag tube is prevented from being torn.

In the guide plate for a side air bag according to the present invention, since the lower wall of the side air bag housing is supported by the support member of the guide plate, the air bag tube being deployed can be more stably introduced into the passenger space of the vehicle.

Moreover, because a bent member is formed on the support member, when the gas under a high pressure is injected into the side air bag tube, impact force at the time the door of the side air bag housing is momentarily flexed and returned toward its original position can be absorbed, whereby it is possible to effectively prevent the support member from being deformed or destroyed.

Besides, due to the fact that fastening pieces are formed on the guide plate according to the present invention, a fastening plate for fastening the side air bag can be conveniently fastened without using separate fastening means.

In addition, as a plurality of slots are defined through the guide plate according to the present invention, the weight of the guide plate can be considerably decreased, and a manufacturing cost can be saved.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A guide plate for a side air bag, comprising:
    a fastening member fastened with an outer surface thereof in contact with an inner surface of a vehicle body, the fastening member having an inner surface opposite the outer surface, the fastening member having at opposing ends of the inner and the outer surfaces an upper end and a lower end defined relative to the vehicle body, the fastening member being fastened to the vehicle body in the upper end of the fastening member;
    a support member formed at a terminal part of the lower end of the fastening member and extending toward a passenger space of the vehicle body;
    a retaining member extending from the inner surface of the fastening member in the upper end of the fastening member toward the passenger space of the vehicle body;
    wherein an airbag housing, with a folded airbag tube received therein, is located between the retaining member and the support member and along a length of the inner surface of the fastening member.

2. The guide plate according to claim 1, wherein an extended member is integrally formed on one lengthwise end of the support member such that the support member exhibits a width that is wider than a width exhibited by the fastening member over the length of the fastening member.

3. The guide plate according to claim 1, wherein extended members are respectively and integrally formed on both lengthwise ends of the support member such that the support member exhibits a width that is wider than a width exhibited by the fastening member over the length of the fastening member.

4. The guide plate according to claim 1, wherein an extended retaining member is integrally formed on one lengthwise end of the retaining member to extend toward an inflator such that the retaining member exhibits a width that is wider than a width exhibited by the fastening member over the length of the fastening member.

5. The guide plate according to claim 1, wherein extended retaining members are respectively and integrally formed on both lengthwise ends of the retaining member such that the retaining member exhibits a width that is wider than a width exhibited by the fastening member over the length of the fastening member.

6. The guide plate according to claim 1, wherein an engagement member is formed on a distal end of the retaining member and angled relative to the retaining member.

7. The guide plate according to claim 6, wherein a guide member is formed on a distal end of the support member and angled relative to the support member, the guide member being spaced apart from the engagement member.

* * * * *